No. 773,686. PATENTED NOV. 1, 1904.
E. A. SPERRY.
STORAGE BATTERY.
APPLICATION FILED FEB. 11, 1904.
NO MODEL.
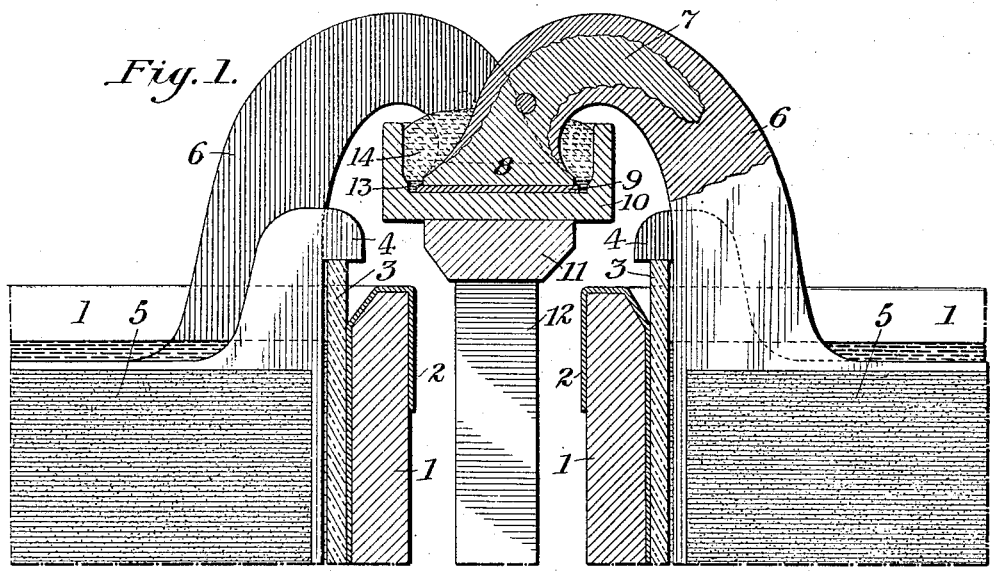
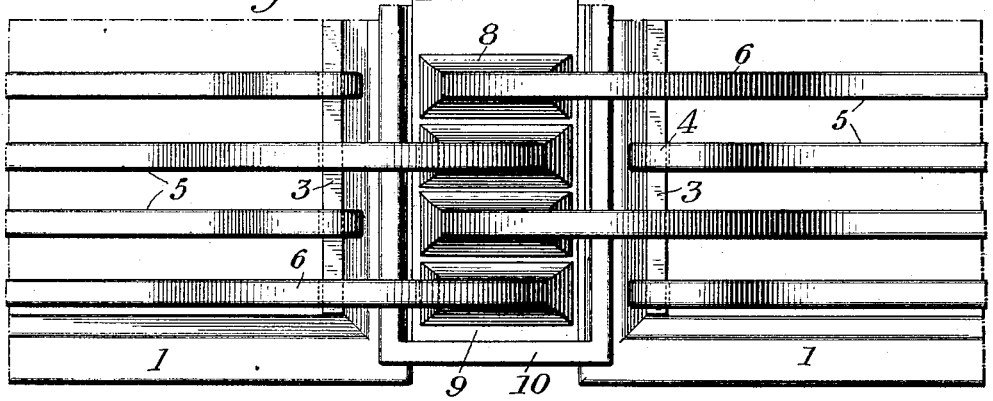
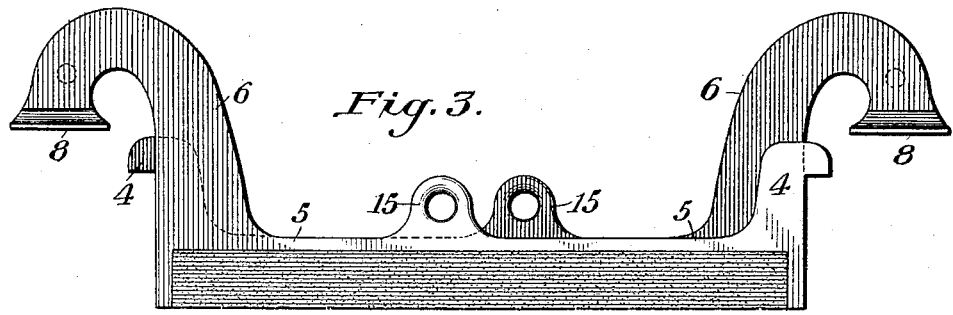
Witnesses:
R A Balderson
J. B. Hill
Inventor:
Elmer A. Sperry,
by Byrnes & Townsend
Att'ys.

No. 773,686.

Patented November 1, 1904.

UNITED STATES PATENT OFFICE.

ELMER A. SPERRY, OF CLEVELAND, OHIO.

STORAGE BATTERY.

SPECIFICATION forming part of Letters Patent No. 773,686, dated November 1, 1904.

Application filed February 11, 1904. Serial No. 193,158. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Storage Batteries, of which the following is a specification.

This invention relates to storage batteries employing lead electrodes, and especially to the large batteries which are used in central stations. It is customary to support the electrodes of such batteries by lugs which project upwardly and outwardly from each electrode and rest on the upper edge of the containing vessel or on vertical glass plates inside the opposite walls of the vessel. The weight of the large lead electrodes makes it necessary to provide containing vessels of great strength. It is also customary to solder or burn the terminals of the electrodes of like sign in each battery to a current-main, the alternate electrodes of adjacent batteries being connected to the same main. These rigid connections make it a difficult and expensive matter to remove any electrode for inspection or renewal.

The improved battery comprises a vessel and electrodes each of which has at one end a lug carried by the vessel and at the other end a terminal which extends outwardly over the edge of the vessel and rests upon a separate support, thus relieving the vessel of one-half of the weight of the electrodes. Each terminal is preferably curved downwardly and provided with a flat face which rests upon and makes good electrical contact with a flat metal strip serving as a current-main. It has been found desirable to provide each lead terminal with an iron contact-piece having a shank which is cast into the lead and serves to stiffen it. The iron, having a higher specific electrical conductivity than the lead, decreases the resistance of the terminal and makes it possible to amalgamate with mercury both the surfaces of the contact-pieces and the strip upon which they rest, thus reducing the resistance at this point to a negligible quantity. To protect the iron contact-pieces and the strip upon which they rest from corrosion by acid fumes, the strip is preferably placed on the flat bottom of a non-conducting trough and the space above the strip and between the terminals is filled with a seal of plastic insulating material, such as vaseline. Each electrode may be provided near its middle with an upwardly-projecting eye to receive a hook for lifting the electrode out of the cell, the eyes of adjacent electrodes being out of alinement.

Referring to the accompanying drawings, Figure 1 is a transverse vertical section through the adjacent upper portions of two cells and the intermediate support-trough and current-main. Fig. 2 is a plan view of the parts shown in Fig. 1, and Fig. 3 is a side elevation of the upper portions of two adjacent electrodes.

This battery comprises a comparatively light containing vessel 1, with a lead lining 2. A vertical glass plate 3 at each side of the vessel serves as a support for the lugs 4 at one end of the alternate electrodes 5. A terminal lug 6 at the other end of each electrode curves upwardly and outwardly over the edge of the vessel and thence downwardly. The shank 7 of an iron contact-piece 8 is cast into each terminal 6, serving both to stiffen it and increase its conductivity. The lower face of each piece 8 is flat and rests directly upon the flat upper surface of a strip 9 of copper or iron, which serves both as a support and current-main. The strip 9 is supported on the flat bottom of a trough 10, of insulating material, such as vulcanized fiber or wood, which in turn rests upon a wooden beam 11, carried on the upper end of posts 12. The faces of the iron contact-pieces 8 and the upper surface of the strip 9 are almalgamated, as by sodium amalgam, to give perfect electrical contact. A shallow layer of mercury 13 is placed in the trough, covering the contact-surfaces, and the trough is filled with a seal 14, of plastic insulating material, preferably vaseline, which effectively excludes acid fumes.

Each electrode of this battery being a distinct and independent unit removably carried by its lug 4 and terminal 6 may be readily withdrawn for inspection or repairs and as readily replaced. An eye 15 is cast on the upper edge of each electrode near its middle to receive the hook of a traveling crane or other means for withdrawing and replacing the plates. The eyes of adjacent electrodes are out of alinement to prevent the cranehook from short-circuiting the electrodes.

The provision of an independent support carrying half the weight of the electrodes makes it possible to greatly decrease the weight and cost of the containing vessels without sacrificing their necessary strength. Any or all of the electrodes may be removed and replaced at a moment's notice. Blowpipe devices for burning the joints are rendered unnecessary. Repeated tests have shown that the fall of potential through the terminals and amalgamated contacts of this battery is less than in batteries using burned joints. The seal of vaseline perfectly protects the contact-pieces and current-main, so that they show no corrosion after months of service.

While the novel features of this invention are of especial utility in lead batteries, they are obviously applicable to storage batteries of other types and to primary cells.

I claim—

1. A battery, comprising a vessel, electrodes each having a support-lug at one side of said vessel, and a support for said lugs independent of said vessel, as set forth.

2. A battery, comprising a vessel, electrodes each having a laterally-deflected support-lug, and a support beneath said lugs and independent of said vessel, as set forth.

3. A battery, comprising a vessel, electrodes each having a support-lug which extends laterally and downwardly, and a support beneath said lugs and independent of said vessel, as set forth.

4. A battery, comprising a vessel, electrodes each having a support-terminal, and a carrier and current-main for said terminals independent of said vessel, as set forth.

5. A battery, comprising a vessel, electrodes having support-lugs at each end, the lugs at one end being carried by said vessel, and a carrier for the lugs at the other end, said carrier independent of said vesssel, as set forth.

6. A battery, comprising a vessel, electrodes each having a support-lug at one end and a support-terminal at the other end, said lugs being carried by said vessel, and a carrier and current-main for said terminals, said carrier independent of said vessel, as set forth.

7. A lead electrode having a support-lug, and a stiffening-piece within said lug, as set forth.

8. A lead electrode having a support-lug, and a contact-piece having a stiff shank within said lug, as set forth.

9. A lead electrode having a support-lug, and an iron contact-piece having a stiff shank within said lug, as set forth.

10. A lead electrode having an amalgamated-iron contact-piece, as set forth.

11. A battery, comprising a vessel, separate electrodes each having a terminal, and a rigid current-main, said terminals having end faces in contact with said main, as set forth.

12. A battery, comprising a vessel, separate lead electrodes each having an iron terminal, and a current-main, said terminals having end faces in contact with said main, as set forth.

13. A battery, comprising a vessel, separate lead electrodes each having an iron terminal, and a current-main having an amalgamated surface, said terminals having amalgamated faces in contact with said amalgamated surface, as set forth.

14. A battery, comprising a vessel, separate electrodes each having a terminal, and a trough containing a layer of mercury and supporting said terminals, as set forth.

15. A battery, comprising a vessel, separate electrodes each having a terminal, a trough containing a layer of mercury and receiving said terminals, and a seal of plastic insulating material over said mercury, as set forth.

16. A battery, comprising a vessel, separate electrodes each having a terminal, a trough, a conductor in said trough in contact with said terminals, and a seal of plastic insulating material in said trough, as set forth.

17. A battery, comprising a vessel, separate electrodes each having a terminal, a trough, and a metal strip in said trough having a flat surface, said terminals having faces in contact with said flat surface, as set forth.

18. A battery, comprising a vessel, separate electrodes each having a terminal, a trough, a metal strip in said trough having a flat surface, said terminals having faces in contact with said flat surface, and a layer of mercury in said trough, as set forth.

19. A battery, comprising a vessel, separate electrodes each having a terminal, a trough, a metal strip in said trough having a flat surface, said terminals having faces in contact with said flat surface, a layer of mercury in said trough, and a seal of plastic insulating material over said mercury, as set forth.

20. A battery, comprising a vessel and separate electrodes, each electrode having a terminal and a carrying-lug near the middle of its upper edge and substantially over its center of gravity, as set forth.

21. A battery, comprising a vessel and separate electrodes, each electrode having a terminal and a carrying-lug near the middle of its upper edge and substantially over its center of gravity, the lugs on adjacent electrodes being out of alinement, as set forth.

In testimony whereof I affix my signature in presence of two witnesses.

ELMER A. SPERRY.

Witnesses:
JOHN H. SIGGERS,
EUGENE A. BYRNES.